US012793428B2

(12) United States Patent
Ogawa

(10) Patent No.: US 12,793,428 B2
(45) Date of Patent: Nov. 10, 2026

(54) DETECTION DEVICE, DETECTION SYSTEM, AND DETECTION METHOD

(71) Applicant: Sumitomo Electric Industries, Ltd., Osaka (JP)

(72) Inventor: Shohei Ogawa, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 267 days.

(21) Appl. No.: 18/578,010

(22) PCT Filed: May 25, 2022

(86) PCT No.: PCT/JP2022/021429
§ 371 (c)(1),
(2) Date: Jan. 10, 2024

(87) PCT Pub. No.: WO2023/286463
PCT Pub. Date: Jan. 19, 2023

(65) Prior Publication Data

US 2024/0331391 A1 Oct. 3, 2024

(30) Foreign Application Priority Data

Jul. 14, 2021 (JP) ................................ 2021-116600

(51) Int. Cl.
*G06V 20/54* (2022.01)
*G06V 20/40* (2022.01)

(52) U.S. Cl.
CPC .............. *G06V 20/54* (2022.01); *G06V 20/44* (2022.01); *G06T 2207/30236* (2013.01)

(58) Field of Classification Search
CPC ........ G06V 20/52; G06V 20/54; G06V 20/58; G06V 20/44
See application file for complete search history.

(56) References Cited

U.S. PATENT DOCUMENTS

2017/0313313 A1* 11/2017 Asakura .......... B60W 30/18009
2020/0254876 A1* 8/2020 Cordell .................. B60K 35/85
(Continued)

FOREIGN PATENT DOCUMENTS

CN 208256095 U 12/2018
JP H06-251285 A 9/1994
(Continued)

OTHER PUBLICATIONS

Xing, Jiang ("Evaluation of Roadside Wrong-Way Warning systems with Different Types of Sensors" Journal of Traffic and Transportation Engineering) 2016 (Year: 2016).*

*Primary Examiner* — Molly Wilburn
(74) *Attorney, Agent, or Firm* — XSENSUS LLP

(57) ABSTRACT

Provided is a detection device including: a detection unit configured to acquire sensor information from a sensor, the sensor being configured to transmit an electromagnetic wave to a road and receive the electromagnetic wave reflected by a target object to detect the target object, the detection unit being configured to detect an event set in advance, based on the acquired sensor information; a selection unit configured to select, in accordance with a content of the event detected by the detection unit, a camera that captures an image regarding the event out of a plurality of cameras installed on the road; and an instruction unit configured to instruct the camera selected by the selection unit to perform image capturing.

8 Claims, 10 Drawing Sheets

(56) References Cited

U.S. PATENT DOCUMENTS

| | | | | |
|---|---|---|---|---|
| 2021/0341303 | A1 * | 11/2021 | Rappel-Kroyzer | G08G 1/0141 |
| 2024/0027605 | A1 * | 1/2024 | Goldhammer | G08G 1/04 |

FOREIGN PATENT DOCUMENTS

| | | | | | |
|---|---|---|---|---|---|
| JP | 2002-541536 | A | | 12/2002 | |
| JP | 2003-157487 | A | | 5/2003 | |
| WO | 00/46775 | A1 | | 8/2000 | |
| WO | WO-2020141504 | A1 | * | 7/2020 | G06Q 50/26 |

* cited by examiner

DETECTION DEVICE 20

DETECTION DEVICE, DETECTION SYSTEM, AND DETECTION METHOD

CROSS-REFERENCE TO RELATED APPLICATIONS

The present application is based on PCT/JP2022/021429, filed on May 25, 2022, which claims priority from Japanese Patent Application No. 2021-116600, filed on Jul. 14, 2021, the entire contents of each are incorporated herein by reference.

TECHNICAL FIELD

The present disclosure relates to a detection device, a detection system, and a detection method.

This application claims priority on Japanese Patent Application No. 2021-116600 filed in Japan on Jul. 14, 2021, the entire contents of which are incorporated herein by reference.

BACKGROUND ART

To date, a system in which: a camera is installed on a road through which vehicles pass; and the road situation is monitored based on an image captured by the camera, has been known.

PATENT LITERATURE 1 describes a system in which: a vehicle having ignored a traffic signal at an intersection is detected; and a camera performs image capturing of the detected vehicle. This system includes: an intersection complete view camera that has a complete view of an intersection; a vehicle-image-capturing camera that performs image capturing of a specific vehicle having entered the intersection; and a speed sensor that detects a vehicle entering the intersection at a speed equal to or higher than a set speed. During a red light, when the speed sensor has detected a vehicle (traffic-light-ignoring candidate vehicle) entering the intersection at a speed equal to or higher than the set speed, image processing is performed on a video of the vehicle-image-capturing camera to detect the traffic-light-ignoring candidate vehicle. When the traffic-light-ignoring candidate vehicle has been detected, the system converts the video of the vehicle-image-capturing camera into a plurality of frames of static images and records the static images. Accordingly, the vehicle number (number plate) and the driver of the vehicle that has ignored the traffic signal in the intersection are recorded as a static image.

CITATION LIST

Patent Literature

PATENT LITERATURE 1: Japanese Laid-Open Patent Publication No. H6-251285

SUMMARY OF THE INVENTION

A detection device of the present disclosure includes: a detection unit configured to acquire sensor information from a sensor, the sensor being configured to transmit an electromagnetic wave to a road and receive the electromagnetic wave reflected by a target object to detect the target object, the detection unit being configured to detect an event set in advance, based on the acquired sensor information; a selection unit configured to select, in accordance with a content of the event detected by the detection unit, a camera that captures an image regarding the event out of a plurality of cameras installed on the road; and an instruction unit configured to instruct the camera selected by the selection unit to perform image capturing.

A detection method of the present disclosure includes: a step of acquiring sensor information from a sensor, the sensor being configured to transmit an electromagnetic wave to a road and receive the electromagnetic wave reflected by a target object to detect the target object, and of detecting an event set in advance, based on the acquired sensor information; a step of selecting, in accordance with a content of the detected event, a camera that captures an image regarding the event out of a plurality of cameras installed on the road; and a step of instructing the selected camera to perform image capturing.

DETAILED DESCRIPTION

Technical Problem

Figure 1:
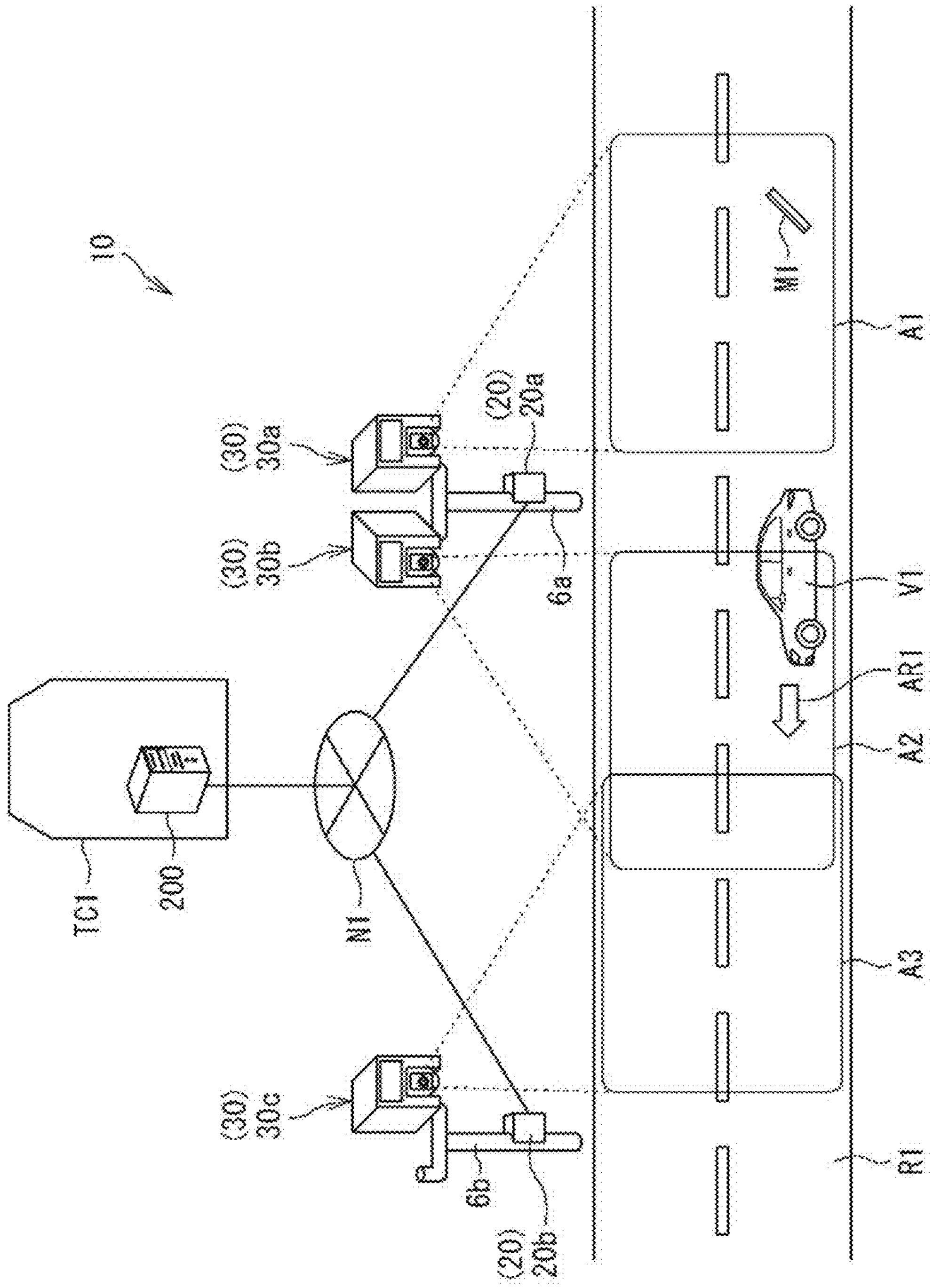
FIG. 1 is a schematic diagram showing an installation example of a detection system according to an embodiment.

In the system of PATENT LITERATURE 1, when a video of the vehicle-image-capturing camera is subjected to image processing, if the traffic-light-ignoring candidate vehicle is not detected, the video of the vehicle-image-capturing camera is not converted into static images. That is, even when an event such as ignoring a traffic signal has been detected, if image capturing of the traffic-light-ignoring candidate vehicle has not been appropriately performed by the vehicle-image-capturing camera, there is a problem that information (vehicle number, etc.) regarding the traffic-light-ignoring candidate vehicle is not recorded.

In consideration of such a problem, an object of the present disclosure is to provide a detection device, a detection system, and a detection method that can more accurately record image information regarding a detected event.

Advantageous Effects of the Present Disclosure

According to the present disclosure, image information regarding a detected event can be more accurately recorded.

Description of Embodiment of the Present Disclosure

An embodiment of the present disclosure includes at least the following as a gist.

(1) A detection device of the present disclosure includes: a detection unit configured to acquire sensor information from a sensor, the sensor being configured to transmit an electromagnetic wave to a road and receive the electromagnetic wave reflected by a target object to detect the target object, the detection unit being configured to detect an event set in advance, based on the acquired sensor information; a selection unit configured to select, in accordance with a content of the event detected by the detection unit, a camera that captures an image regarding the event out of a plurality of cameras installed on the road; and an instruction unit configured to instruct the camera selected by the selection unit to perform image capturing.

According to the detection device of the present disclosure, in accordance with the content of the detected event, a camera that captures an image regarding the detected event is selected out of a plurality of cameras installed on the road. Since a camera appropriate for capturing an image regarding the detected event can be selected, image information regarding the detected event can be more accurately recorded.

(2) A plurality of the events set in advance may be present, and out of the plurality of the events set in advance, the detection unit may detect one or a plurality of the events, based on the sensor information. Accordingly, in accordance with the detected event, a camera that captures an image regarding the event can be selected. Thus, image information regarding the detected event can be appropriately recorded.

(3) The plurality of the events set in advance may include an event capable of occurring in a target region where the sensor acquires the sensor information. Accordingly, with respect to the event capable of occurring in the target region where the sensor information is acquired, appropriate image information can be recorded.

(4) The plurality of the events set in advance may include at least one of: overspeed road traveling by a vehicle, at a speed exceeding a legal speed or a designated speed; wrong-way traveling of a vehicle on the road; parking of a vehicle on the road; a congestion of the road; and presence of a fallen object on the road. Such an event is highly necessary to be recorded. Therefore, with this configuration, image information regarding an event highly necessary to be recorded can be appropriately recorded.

(5) When the detection unit has detected overspeed road traveling by a vehicle as the event, the selection unit may select, out of the plurality of cameras, a camera of which an image capturing target is a region downstream in a traveling direction of the road with respect to a target region where the sensor acquires the sensor information.

With this configuration, image capturing of the vehicle traveling at an overspeed on the road can be more assuredly performed.

(6) When the detection unit has detected wrong-way traveling of a vehicle on the road as the event, the selection unit may select, out of the plurality of cameras, a camera of which an image capturing target is a region upstream in a traveling direction of the road with respect to a target region where the sensor acquires the sensor information.

With this configuration, image capturing of the wrong-way traveling vehicle can be more assuredly performed.

(7) In accordance with the event detected by the detection unit, the instruction unit may determine, as an image capturing condition for the camera selected by the selection unit, either of a first image capturing condition under which image capturing is performed at a predetermined number of frames, and a second image capturing condition under which image capturing is performed at a number of frames larger than the predetermined number of frames, and may issue an instruction to perform image capturing under the determined image capturing condition.

With this configuration, in accordance with the event, image capturing can be performed at a more appropriate number of frames, and thus, detailed information of the event can be more accurately detected based on the image.

(8) When the detection unit has detected parking of a vehicle on the road, a congestion of the road, or presence of a fallen object on the road, as the event set in advance, the instruction unit may determine the first image capturing condition as the image capturing condition for the camera selected by the selection unit, and may issue an instruction to perform image capturing under the determined first image capturing condition. When the detection unit has detected overspeed road traveling by a vehicle at a speed exceeding a legal speed or a designated speed or wrong-way traveling of a vehicle on the road, as the event set in advance, the instruction unit may determine the second image capturing condition as the image capturing condition for the camera selected by the selection unit, and may issue an instruction to perform image capturing under the determined second image capturing condition.

For an event in which the image capturing target is a traveling vehicle as in the case of overspeed or wrong-way traveling, when image capturing is performed at a larger number of frames, the traveling vehicle can be more assuredly included in the image. For an event in which the image capturing target is an object that is stopped or traveling at a relatively low speed as in the case of parking, a congestion, or a fallen object, when image capturing is performed at a smaller number of frames, the volume of data can be saved.

(9) The detection device may further include a detailed detection unit configured to, based on the image captured by the camera selected by the selection unit, detect detailed information of the event detected by the detection unit.

(10) When the detection unit has detected overspeed road traveling by a vehicle at a speed exceeding a legal speed or a designated speed, wrong-way traveling of a vehicle on the road, or parking of a vehicle on the road, as the event set in advance, the detailed detection unit may detect information regarding a number plate of a target vehicle as the detailed information.

(11) A detection system of the present disclosure includes the sensor, a plurality of the cameras, and the detection device according to any one of (1) to (10) above.

(12) A detection method of the present disclosure includes: a step of acquiring sensor information from a sensor, the sensor being configured to transmit an electromagnetic wave to a road and receive the electromagnetic wave reflected by a target object to detect the target object, and of detecting an event set in advance, based on the acquired sensor information; a step of selecting, in accordance with a content of the detected event, a camera that captures an image regarding the event out of a plurality of cameras installed on the road; and a step of instructing the selected camera to perform image capturing.

According to the detection method of the present disclosure, since the camera is selected in accordance with the content of the detected event, image information regarding the detected event can be more accurately recorded.

DETAILS OF EMBODIMENTS OF THE PRESENT DISCLOSURE

Hereinafter, details of embodiments of the present disclosure will be described with reference to the drawings.

On a road, many types of events such as illegal parking, a fallen object from a vehicle, overspeed of a vehicle, wrong-way traveling of a vehicle, and a congestion can occur. These events easily lead to serious accidents. Therefore, with respect to such an event, for example, it is desired to record image information regarding the event in order to confirm the situation and the like at the time of occurrence of the event.

A detection system according to the present embodiment acquires sensor information from a sensor installed on a road, and processes the acquired sensor information, to detect occurrence of such an event. Further, based on the detection result, the detection system instructs a camera to perform image capturing, to acquire (record) detailed information of the event.

The place of which image capturing should be performed by the camera, and the matter of which image capturing should be performed by the camera are different depending on the content (the type of the event, the occurrence place of the event, etc.) of the event that occurs. For example, when the presence of a fallen object on a road has been detected by a sensor, it is necessary to perform image capturing of the fallen object by the camera, and to detect, based on an image, what the fallen object is. In this case, the place of which image capturing should be performed by the camera is the place where the sensor has detected the fallen object, and in order to know details of the fallen object, it is appropriate for the camera to zoom in to perform image capturing of the place.

When a vehicle that is wrong-way traveling on a road has been detected by a sensor, it is preferable to perform image capturing of the vehicle by the camera, and be able to detect, based on an image, information regarding the number plate of the vehicle. In this case, the place of which image capturing should be performed by the camera is the place where the sensor has detected the vehicle, and the place (i.e., a place through which the wrong-way traveling vehicle will pass after the time point of the detection by the sensor) that is positioned upstream in the traffic direction of the road with respect to the place. Therefore, it is preferable that, in addition to the camera that performs image capturing of the detected place, another camera positioned upstream in the traffic direction can be caused to operate.

Thus, the detection system according to the present embodiment selects, in accordance with the content of the detected event, a camera to be used in capturing an image regarding the event out of a plurality of cameras installed on a road. Accordingly, even when various events occur on the road, and the place of the occurrence, the matter, and the like that should be recorded are different in each event, the detection system according to the present embodiment accurately records the situation of each event on the basis of the detection result of the event, by using the camera.

Entire Configuration of Detection System

FIG. 1 is a schematic diagram showing an installation example of a detection system 10 according to the present embodiment. The detection system 10 includes a plurality of detection devices 20*a*, 20*b* and a plurality of sensor units 30*a*, 30*b*, 30*c*. Preferably, the detection devices 20*a*, 20*b* each have the same configuration. The detection devices 20*a*, 20*b* will be, when not distinguished from each other in particular, simply referred to as a "detection device 20". Preferably, the sensor units 30*a*, 30*b*, 30*c* each have the same configuration. The sensor units 30*a*, 30*b*, 30*c* will be, when not distinguished from each other in particular, simply referred to as a "sensor unit 30". In FIG. 1, two detection devices 20 and three sensor units 30 are shown as an example, and the numbers of the detection devices 20 and the sensor units 30 included in the detection system 10 are not limited in particular.

The detection device 20 is a device that detects an event, based on sensor information from the sensor unit 30. The detection device 20 functions as an integrated processing device that processes sensor information from the sensor unit 30, that controls the sensor unit 30 and the like, and that transmits information to another detection device. The detection device 20 is communicably connected to the sensor unit 30 in a wired or wireless manner. In the present embodiment, the detection device 20*a* controls the sensor units 30*a*, 30*b*, for example, and the detection device 20*b* controls the sensor unit 30*c*, for example. The detection device 20*a* and the detection device 20*b* are connected to each other through an electric telecommunication network N1.

The detection device 20 and the sensor unit 30 may be in one-to-many correspondence as in the detection device 20*a*, or may be in one-to-one correspondence as in the detection device 20*b*. A single detection device 20 may control all the sensor units 30 included in the detection system 10.

The detection device 20 and the sensor unit 30 are each installed at a roadway or a position in the vicinity thereof and facing the roadway (these will be collectively referred to as "road R1"). The road R1 is an expressway (national expressway), for example. The road R1 is not limited in particular as long as the road R1 is a road on which vehicles pass, and may be a national road, a prefectural road, or another road. In addition to a region where vehicles can normally travel, the road R1 may be configured to include a region, such as a road shoulder and an emergency parking bay, that a vehicle can enter during an emergency, and a median strip.

In FIG. 1, an arrow AR1 indicates the traffic direction of vehicles in the road R1. The road R1 is one-way, for example, and passage of vehicles is allowed only in a traffic direction AR1. In the following description, downstream in the traffic direction AR1 will be simply referred to as "downstream" as appropriate, and upstream in the traffic direction AR1 will be simply referred to as "upstream" as appropriate.

On the road R1, posts 6*a*, 6*b* . . . are provided at a predetermined interval (e.g., every 100 m to 300 m). The detection device 20*a* is provided in a lower part of the post 6*a*, and the sensor units 30*a*, 30*b* are provided in an upper part of the post 6*a*. The detection device 20*b* is provided in a lower part of the post 6*b*, and the sensor unit 30*c* is provided in an upper part of the post 6*b*.

The sensor unit 30 is a unit for detecting an event in the road R1. The sensor unit 30*a* detects an event in a first region A1, the sensor unit 30*b* detects an event in a second region A2, and the sensor unit 30*c* detects an event in a third region A3. The first to third regions A1 to A3 are regions included in the road R1. The regions set for the respective sensor units 30 need not necessarily overlap with another region as in the first region A1, or may overlap another region as in the second region A2 and the third region A3. In the present embodiment, target regions for event detection are arranged in an order of, from upstream, the first region A1, the second region A2, and the third region A3.

The detection device 20 communicates with a management device 200 through the electric telecommunication network N1. The management device 200 is a device that manages a plurality of the detection devices 20. This management device 200 is provided in a traffic control center TC1, for example.

<Configuration of Sensor Unit>

Figure 2:
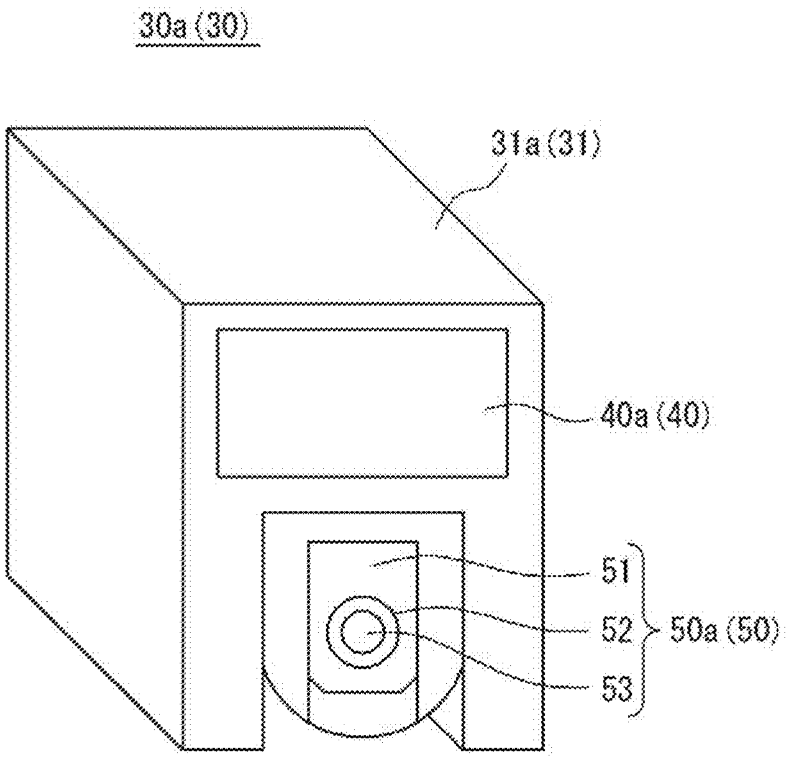
FIG. 2 is a perspective view schematically showing a sensor unit according to the embodiment.

FIG. 2 is a perspective view schematically showing the sensor unit 30*a*. The sensor unit 30*a* has a housing 31*a*, a sensor 40*a*, and a camera 50*a*. In the present embodiment, the sensor 40*a* and the camera 50*a* are housed in a single housing 31*a*. However, the sensor 40*a* and the camera 50*a* may be housed in separate housings.

The sensor units 30*b*, 30*c* also have a configuration similar to that of the sensor unit 30*a*. Specifically, the sensor unit 30*b* has a housing (not shown), and a sensor 40*b* and a camera 50*b* which are housed in the housing. The sensor unit 30*c* also has a housing (not shown), and a sensor 40*c* and a camera 50*c* which are housed in the housing. Preferably, the housings of the sensor units 30*a*, 30*b*, 30*c*, the sensors 40*a* to 40*c*, and the cameras 50*a* to 50*b* each have the same configuration, and will be simply referred to as a "housing 31", a "sensor 40", and a "camera 50", respectively, when not distinguished from each other in particular.

The sensor 40 includes a millimeter wave radar for measuring the position, the direction, the speed, and the like of a target object by radiating an electromagnetic wave in a millimeter wave band (20 to 300 GHz) toward the target object, and receiving and processing a reflected wave. For a modulation method for the millimeter wave radar, FMCW (Frequency Modulated Continuous Wave) is used, for example. The sensor 40 has: an emission unit that emits the electromagnetic wave to the road R1; a reception unit that receives the electromagnetic wave (reflected wave) reflected by the road R1 (or an object on the road R1); and a processing circuit.

The processing circuit detects the distance of a target object for which the intensity of the reflected wave is equal to or higher than a predetermined threshold, the direction of the target object, and the speed of the target object. Specifically, the processing circuit measures a time period from emission of an electromagnetic wave to reception of a reflected wave, to calculate the distance from the sensor 40 to the target object. The reception unit includes a plurality of reception antennas, and the processing circuit calculates the direction of the target object with respect to the sensor 40, based on a phase difference of the reflected wave caused by the time difference when the plurality of reception antennas receive the reflected wave. Further, based on the Doppler shift of the received electromagnetic wave, the processing circuit calculates the speed of the target object with respect to the sensor 40.

The sensor 40 transmits, as sensor information D1, data of the position (the distance and the direction) and the speed of the target object obtained in this manner, to the detection device 20. The sensor 40 may be configured to include another object detection sensor such as LiDAR.

The sensor 40 may be a camera (imaging sensor) that performs image capturing of the road R1 with visible light or infrared light. In this case, the camera 50 may be caused to have both of the function as the sensor 40 for detecting the presence or absence and the type of an event, and the function as the camera 50 for detecting detailed information of the event. The sensor 40 may be a camera different from the camera 50.

The camera 50 is an imaging device for recording detailed information of an event detected by the sensor 40. For example, the camera 50 performs image capturing of a complete view of a region as a target during normal time, and when an event has been detected, records detailed information of the event. This camera 50 has: a movable part 51 capable of changing the image capturing direction; a zoom lens 52 capable of changing the focal distance; and an imaging element 53 that converts optical information to an electronic signal. The camera 50 may acquire, one by one, an image (static image) in accordance with a command from the detection device 20, or may acquire a plurality of images as a moving image at a predetermined number of frames in accordance with a command from the detection device 20. Further, the camera 50 may have a light emitting unit that emits light (e.g., stroboscopic emission) in the form of visible light or infrared light.

In the present embodiment, the region of which image capturing is performed by the camera 50 includes a region where the sensor 40 detects an event. For example, when the sensor 40*a* detects an event in the first region A1, the camera 50*a* performs image capturing of a region including the first region A1. Thus, the camera 50 that performs image capturing of the region including the region detected by the sensor 40 will be referred to as a "camera 50 corresponding to the sensor 40". In the case of the present embodiment, the camera 50 corresponding to the sensor 40*a* is "the camera 50*a*", and the camera 50 corresponding to the sensor 40*b* is "the camera 50*b*".

<Configuration of Detection Device>

Figure 3:
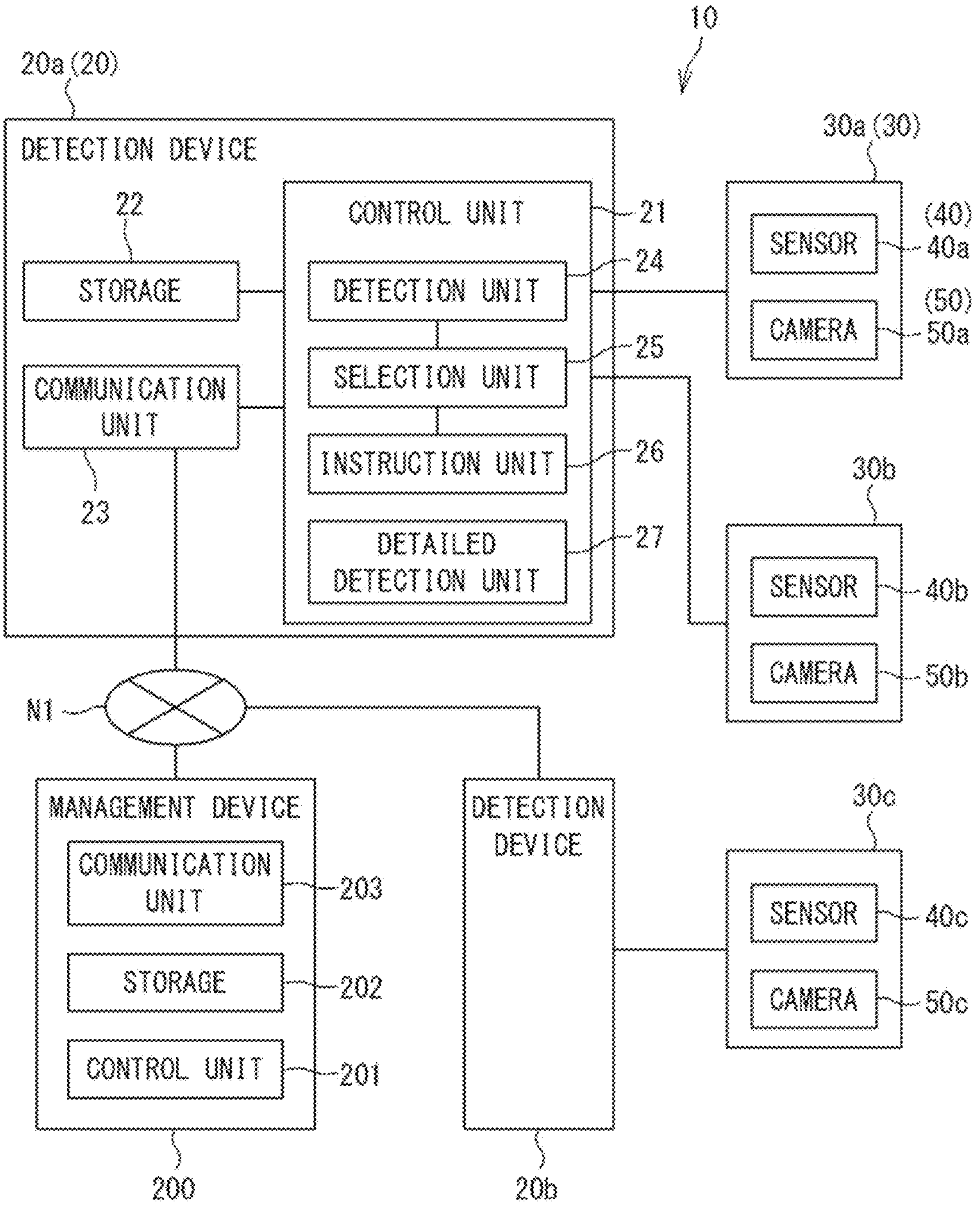
FIG. 3 is a block diagram showing a functional configuration of the detection system according to the embodiment.

FIG. 3 is a block diagram showing a functional configuration of the detection system 10. FIG. 3 shows the functional configuration of the detection device 20*a* in detail. The functional configuration of the detection device 20*b* is the same as that of the detection device 20*a*, and thus is not shown.

The detection device 20 (20*a*) detects an event that has occurred in the road R1, based on the sensor information D1 transmitted from the sensor 40. The detection device 20 is substantially a computer, and has: a control unit 21, a storage 22, and a communication interface that functions as a communication unit 23. The control unit 21 includes a calculation unit (processor). The calculation unit includes a CPU (Central Processing Unit), for example. The calculation unit may be a configuration that further includes a GPU (Graphics Processing Unit). The storage 22 includes a main storage and an auxiliary storage. The main storage includes a RAM (Random Access Memory), for example. The auxiliary storage includes an HDD (Hard Disk Drive) or an SSD (Solid State Drive), for example. By the control unit 21 (calculation unit) executing a computer program stored in the storage 22, the detection device 20 realizes the functions of components 24 to 27 described later.

The control unit 21 has a detection unit 24, a selection unit 25, an instruction unit 26, and a detailed detection unit 27 as function units. These function units 24 to 27 may be realized by the same processing region in the control unit 21 or may be realized by separate processing regions. For example, a single CPU may realize both functions of the detection unit 24 and the detailed detection unit 27, or a CPU that realizes the function of the detection unit 24 and a CPU that realizes the function of the detailed detection unit 27 may be separately provided.

The detection unit 24 detects a predetermined event in the road R1, based on the sensor information D1 acquired from the sensor 40. The storage 22 has stored therein, for each of a plurality of types of events, a selection table in which the content of the event is associated with the camera 50 to be used in image capturing, an image capturing condition, and the like. With reference to the selection table, the selection unit 25 selects, in accordance with the content of the event detected by the detection unit 24, a camera 50 to be used in capturing an image Im1 regarding the event out of a plurality of the cameras 50. The instruction unit 26 instructs the camera 50 selected by the selection unit 25 to perform image capturing. The detailed detection unit 27 detects detailed information D3 of the event, based on the image Im1 captured by the camera 50.

The storage 22 has stored therein a computer program, the sensor information D1, the image Im1, the detailed information D3, the selection table, and other parameters. The communication unit 23 transmits/receives various types of information to/from another detection device 20 and the management device 200 through the electric telecommunication network N1.

<Event Detection by Detection Unit 24>

The detection unit 24 is set to be able to detect a plurality of types of events, based on sensor information from the sensor 40. The plurality of types of events as detection targets include overspeed of a vehicle V1, wrong-way traveling, parking (illegal parking), a fallen object, and a congestion.

The detection unit 24 has a function of performing predetermined preprocessing on the sensor information D1 from the sensor 40, and a function of executing an event detection process of detecting an event, based on data obtained through the preprocessing. The preprocessing includes a clustering process, a tracking process, and the like.

The clustering process is a process for recognizing a target object (e.g., the vehicle V1) by combining a plurality of reflected wave points included in the sensor information D1, into one combined body. Through this process, the target object (the vehicle V1) can be recognized one by one, and the size of the target object can also be estimated.

The tracking process is a process of, based on time series data of the position (the distance and the direction) and the speed of the target object (the vehicle V1) obtained in the clustering process, predicting the next detection position, and comparing the actual detection position with the predicted position, thereby identifying and tracking the target object. Further, in order to discriminate the vehicle V1 detected in this manner, the detection unit 24 provides a vehicle ID to each detected vehicle V1. Such preprocessing may be executed on the sensor unit 30 side.

The event detection process is a process of, based on the speed, the position (driving lane, etc.), the traveling state, and the like of each vehicle V1, detecting occurrence of an event, the vehicle ID of the vehicle V1 involved in the event having occurred, the occurrence place (occurrence position) of the event, and the like.

Specifically, the detection unit 24 compares the vehicle speed with a predetermined speed threshold, to detect overspeed of the vehicle V1. Further, the detection unit 24 monitors the traveling direction of the vehicle V1 for a certain time period, to detect wrong-way traveling of the vehicle V1. Further, when the position of the vehicle V1 does not change for a certain time period (i.e., when the speed is 0), the detection unit 24 detects parking of the vehicle V1. In this case, the detection unit 24 detects illegal parking of the vehicle V1 in accordance with whether or not the position of the parking is a no-parking position.

Further, the detection unit 24 detects a fallen object M1, based on the speed, the direction, the size, and the like of the target object. For example, when the target object is smaller than a predetermined size (e.g., the size of a small vehicle) and is static, the detection unit 24 recognizes that the target object is a fallen object M1. Further, for example, when the target object is smaller than a predetermined size and the target object is recognized to have occurred from behind a traveling vehicle V1 with respect to the vehicle V1, the detection unit 24 recognizes that the target object is a fallen object M1 from the vehicle V1.

Further, based on data of a plurality of vehicles, the detection unit 24 calculates, for each lane in a predetermined time period (e.g., five minutes to ten minutes), the number of vehicles V1 passing therethrough, the average speed of the vehicles V1, occupancy of the vehicles V1 in the lane, and the like, and detects a congestion, based on the calculation result.

Upon detecting occurrence of an event, the detection unit 24 creates event information D2 regarding the detected event. The event information D2 includes, for example, the type of the detected event, the occurrence place (position information) of the event, the occurrence time, the vehicle ID of the vehicle V1 involved in the event, and the like.

<Configuration of Management Device>.

As hardware configuration, the management device 200 has a control unit 201, a storage 202, and a communication unit 203, similar to the detection device 20. The control unit 201 includes a calculation unit (processor) such as a CPU. The storage 202 includes a main storage and an auxiliary storage. The communication unit 203 functions as a communication interface.

<Software configuration>

Figure 4:
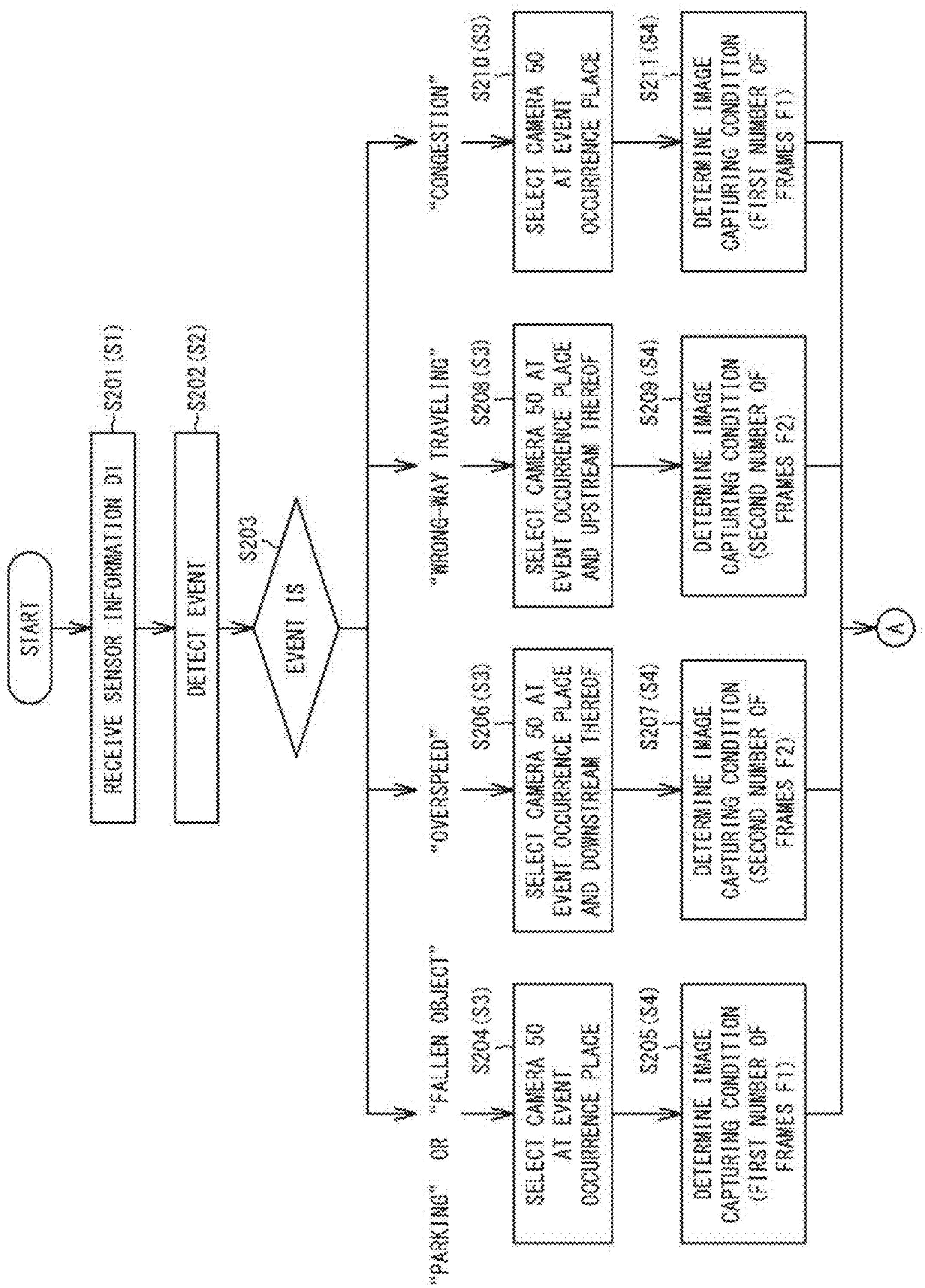
FIG. 4 is a flowchart showing a control structure of a program executed in a detection device according to the embodiment.
Figure 5:
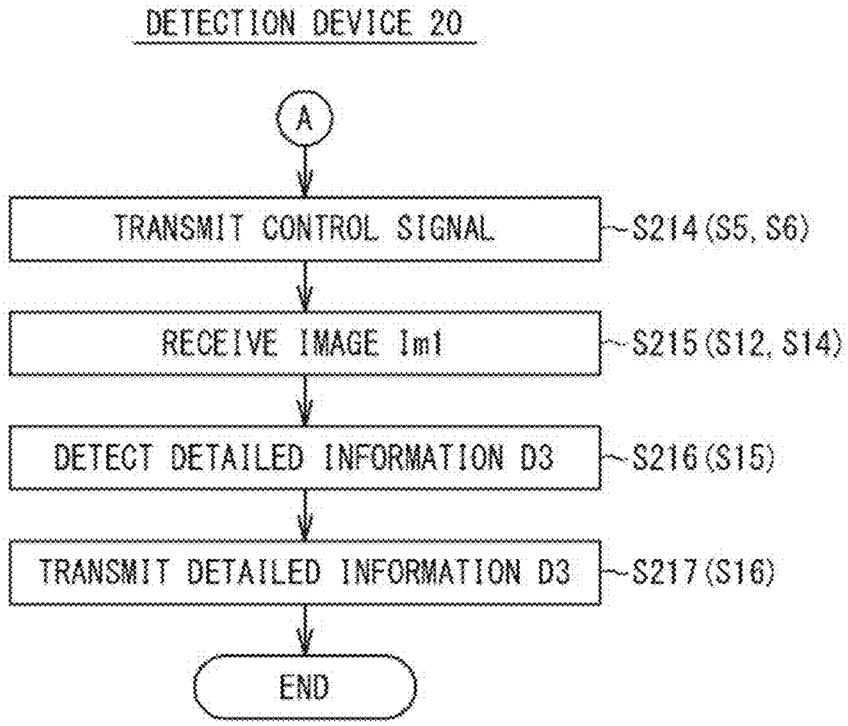
FIG. 5 is a flowchart showing a control structure of the program executed in the detection device according to the embodiment.

FIG. 4 and FIG. 5 are each a flowchart showing a control structure of a program executed in the detection device 20.

With reference to FIG. 4, this program includes: step S201 of receiving the sensor information D1 from the sensor 40; step S202 of executing a process of detecting an event, based on the received sensor information D1; and step S203 of branching the flow of the control in accordance with the detected event. In step S202, in addition to the process of detecting an event, a process of generating the event information D2 regarding the detected event is also executed. The event as the detection target is an event that is likely to be a cause of, for example, delay of traffic or an accident, out of events that can occur in the regions A1 to A3 which are the target region of the sensor 40. The event as the detection target is also an event set in advance in a computer program stored in the storage 22. The event as the detection target includes the following events, for example.

Overspeed: an event representing overspeed road traveling by a vehicle V1

Wrong-way traveling: an event representing wrong-way traveling of a vehicle V1 on the road R1

Parking: an event representing that a vehicle V1 is parked on the road R1

Fallen object: an event representing that a fallen object M1 is present on the road R1

Congestion: an event representing that a congestion has occurred on the road R1

This program further includes: step S204 of selecting the camera 50 at the event occurrence place with reference to the selection table; and step S205 of determining an image capturing condition for the selected camera, step S204 and step S205 being executed when the detected event is "parking" or "fallen object".

This program further includes: step S206 of selecting the camera 50 at the event occurrence place with reference to the selection table; and step S207 of determining an image capturing condition for the selected camera, step S206 and step S207 being executed when the detected event is "overspeed".

This program further includes: step S208 of selecting the camera 50 at the event occurrence place with reference to the selection table: and step S209 of determining an image capturing condition for the selected camera, step S208 and step S209 being executed when the detected event is "wrong-way traveling".

This program further includes: step S210 of selecting the camera 50 at the event occurrence place with reference to the selection table; and step S211 of determining an image capturing condition for the selected camera, step S210 and step S211 being executed when the detected event is "congestion".

With reference to FIG. 5, this program further includes: step S214 of transmitting a control signal to the selected camera 50; step S215 of receiving the image Im1 transmitted from the camera 50 being transmitted the control signal; step S216 of detecting the detailed information D3 of the event from the received image Im1; and step S217 of storing the detected detailed information D3 into the storage 22 and transmitting the detected detailed information D3 to the management device 200 through the communication unit 23 and the electric telecommunication network N1.

The detection device 20 repeatedly executes the above process.

Figure 6:
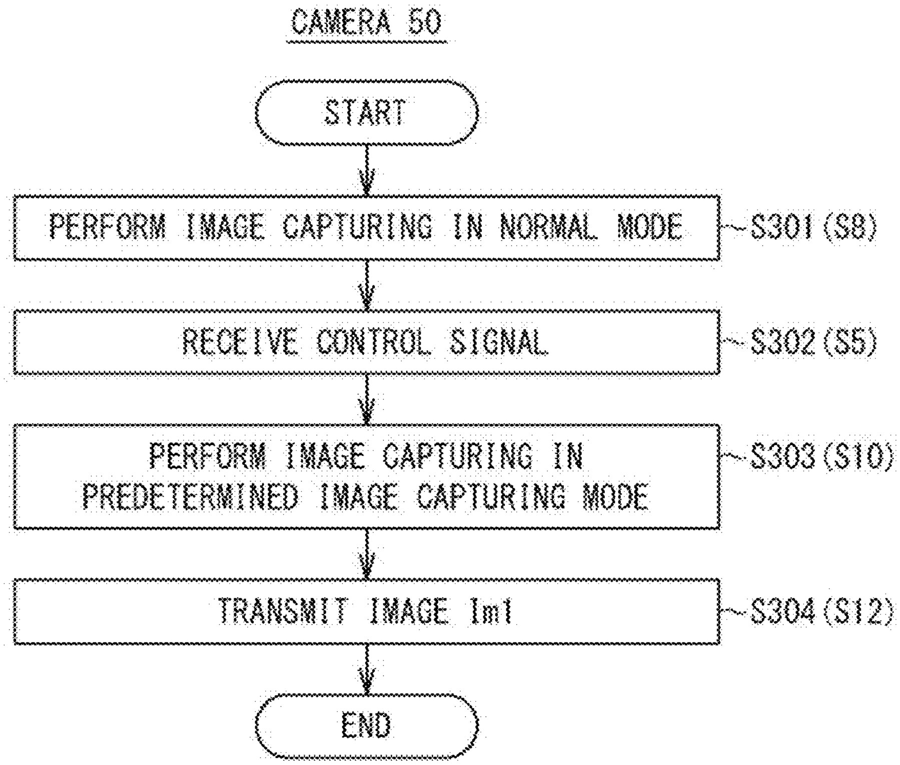
FIG. 6 is a flowchart showing a control structure of a program executed in a camera according to the embodiment.

FIG. 6 is a flowchart showing a control structure of a program executed in the camera 50. With reference to FIG. 6, this program includes: step S301 of performing image capturing in a normal mode; step S302 of receiving a control signal from the detection device 20; step S303 of performing image capturing in a predetermined image capturing mode, based on an instruction of the received control signal; and step S304 of transmitting the image Im1 captured in the predetermined image capturing mode, to the detection device 20 having transmitted the control signal. The normal mode in step S301 is a mode in which, for example, image capturing of a complete view of a region as the target is performed at a number of frames equal to or less than a first number of frames F1.

<Operation of Detection System>

Figure 7:
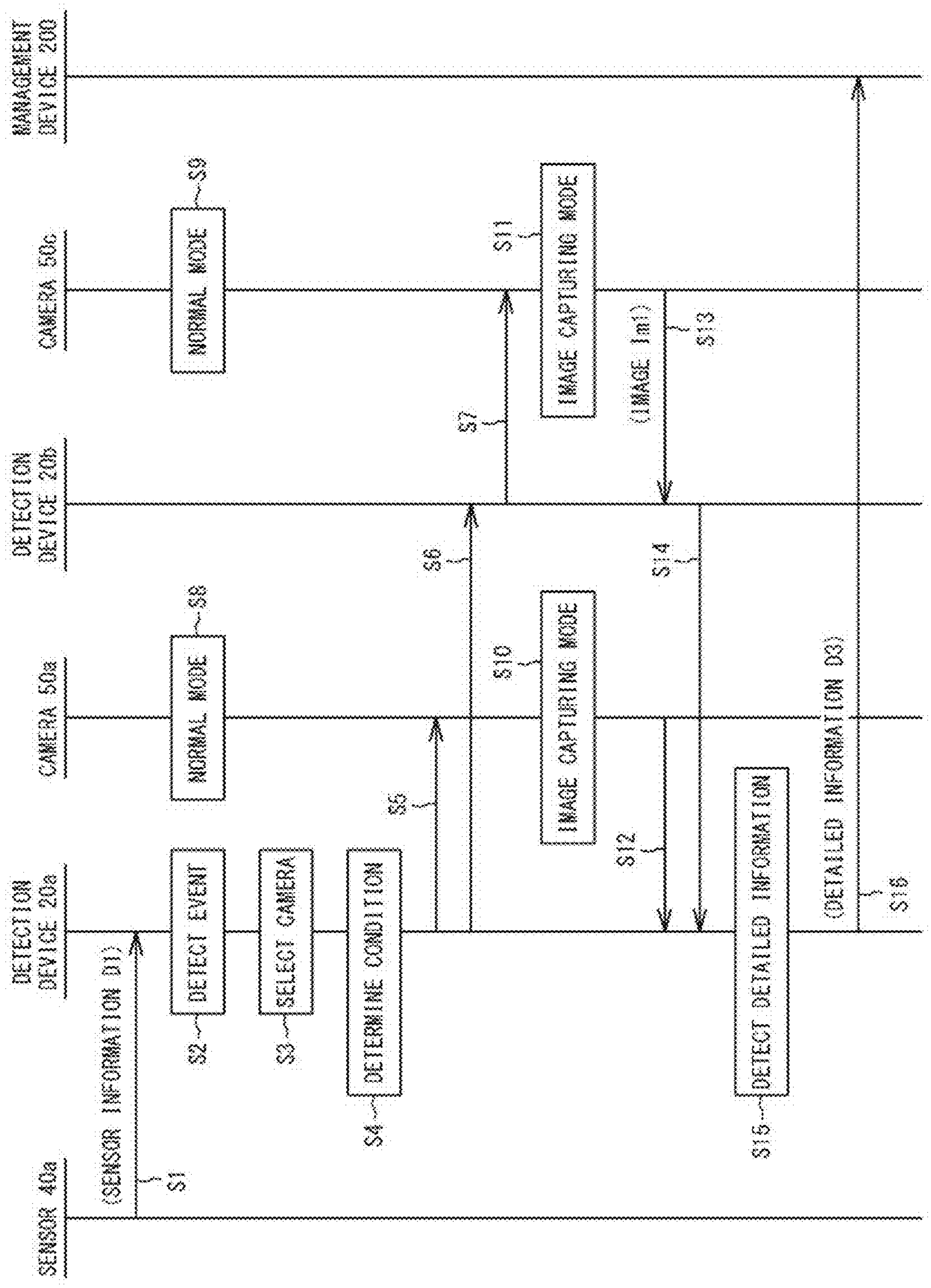
FIG. 7 is a sequence diagram showing an example of a detection method executed by the detection system according to the embodiment.

FIG. 7 is a sequence diagram showing an example of a detection method executed by the detection system 10.

In the following, with reference to FIG. 1 to FIG. 7 as appropriate, operation of the detection system 10 will be described.

The sensor 40*a* always emits an electromagnetic wave to the road R1 and receives a reflected wave. Based on the received reflected wave, the sensor 40*a* generates the sensor information D1 (electric signal) and transmits the generated sensor information D1 to the detection device 20*a* (step S1).

Upon receiving the sensor information D1, the control unit 21 of the detection device 20*a* stores the received sensor information D1 into the storage 22. Based on the received sensor information D1, the detection unit 24 of the detection device 20*a* executes the above-described preprocessing and event detection process, thereby detecting occurrence of a predetermined event, the vehicle ID of the vehicle V1 involved in the event having occurred, the occurrence place (occurrence position) of the event, and the like, and creates the event information D2 regarding the detected event (step S2). The created event information D2 is stored into the storage 22. The event information D2 includes, for example, the type of the event, the occurrence place of the event, the occurrence time of the event, the vehicle ID of the vehicle V1 related to the event, and the speed of the vehicle V1 related to the event.

The predetermined event may include an event other than those described above.

Next, the selection unit 25 extracts information regarding the type of the event and the occurrence place of the event from the event information D2. In accordance with the type of the event included in the event information D2, the selection unit 25 selects a camera 50 to be used in capturing the image Im1 regarding the event, out of the plurality of the cameras 50*a* to 50*c* (step S3, second step).

Subsequently, with reference to the selection table, the instruction unit 26 determines an image capturing condition for the selected camera 50 (step S4). The image capturing condition includes, for example, an image capturing place (whether the image capturing place is at the center of the road R1 or the road shoulder), a zoom magnification, an image capturing start time, an image capturing time period from image capturing start to image capturing end, the number of frames, and the like.

For example, the selection unit 25 determines which type the detected event corresponds to (step S203). Then, when the type of the event is "parking" or "fallen object", the selection unit 25 selects a camera 50 that performs image capturing of the occurrence place of the event (step S204, step S3). More specifically, when a vehicle V1 that is parked in the first region A1 as the target region of the sensor 40*a* has been detected based on the sensor information D1 from the sensor 40*a*, the selection unit 25 selects the camera 50*a* which performs image capturing of the first region A1.

Subsequently, the instruction unit 26 determines an image capturing condition for the selected camera 50*a* (step S205, step S4). Specifically, the instruction unit 26 determines an image capturing place and a zoom magnification such that the number plate of the vehicle V1 is included. It is considered that the parked vehicle V1 does not immediately (e.g., within several seconds) move. Therefore, in order to save the volume of data, the instruction unit 26 determines the number of frames to be a relatively small, predetermined first number of frames F1 (e.g., five frames in one second).

When a fallen object M1 in the first region A1 has been detected based on the sensor information D1 from the sensor 40*a*, the selection unit 25 selects the camera 50*a* which performs image capturing of the first region A1 (step S204). Then, the instruction unit 26 determines an image capturing place such that the place of the fallen object M1 is included, and determines a zoom magnification in accordance with the size of the fallen object M1. It is considered that the fallen object M1 does not immediately move, similar to the parked vehicle V1. Therefore, the instruction unit 26 determines the number of frames to be the first number of frames F1 (step S205).

When a fallen object M1 has been detected, the fallen object M1 needs to be removed. The content of the removal work changes depending on the target of the fallen object M1 (e.g., whether or not the fallen object M1 is heavy) and the place (e.g., whether the fallen object M1 has fallen to the center of the road R1 or has fallen to a road shoulder of the road R1). The worker who performs the removal work determines the details of the fallen object M1, based on the detailed information D3 described later, and goes for the removal work of the fallen object M1.

Therefore, when a fallen object M1 has been detected, the instruction unit 26 may determine both of an image capturing condition for target identification regarding the fallen object M1, and an image capturing condition for place identification regarding the fallen object M1. The image capturing condition for target identification is a condition under which, for example, image capturing is performed by zooming in the fallen object M1 in order to identify in detail what the fallen object M1 is. The image capturing condition for place identification is a condition under which, for example, image capturing of a complete view of the first region A1 including the fallen object M1 is performed in order to identify in detail where in the road R1 the fallen object M1 is positioned. For example, as the image capturing condition, the instruction unit 26 instructs the camera 50*a* to perform image capturing for target identification for a predetermined image capturing time period, and then perform image capturing for place identification for a predetermined image capturing time period.

In detection of a fallen object M1, when a vehicle V1 that has dropped the fallen object M1 has also been able to be detected, the selection unit 25 may select a camera 50 that performs image capturing of a place downstream of the occurrence place (the place of the fallen object M1) of the event, and the instruction unit 26 may determine an image capturing place and a zoom magnification for the camera 50 such that the number plate of the vehicle V1 is included.

When the event is "overspeed", the selection unit 25 selects a camera 50 that performs image capturing of the occurrence place of the event and a camera 50 that performs image capturing of a place downstream of the occurrence place of the event (step S206, step S3).

More specifically, when a vehicle V1 traveling in the first region A1 at a speed exceeding a predetermined speed has been detected based on the sensor information D1 from the sensor 40*a*, the selection unit 25 selects the camera 50*a* which performs image capturing of the first region A1 and the cameras 50*b*, 50*c* which perform image capturing of places downstream of the first region A1. The selection unit 25 need not necessarily select the camera 50 that performs image capturing of the occurrence place of the event and may select only the camera 50 that performs image capturing of the place downstream of the occurrence place of the event.

Subsequently, the instruction unit 26 determines image capturing conditions for the selected cameras 50*a*, 50*b*, 50*c* (step S207, step S4). Specifically, based on the occurrence time of the event and the speed of the vehicle V1 included in the event information D2, the instruction unit 26 determines image capturing times for the respective cameras 50*a*, 50*b*, 50*c*. In addition, the instruction unit 26 determines image capturing places and zoom magnifications for the respective cameras 50*a*, 50*b*, 50*c* such that the number plate of the vehicle V1 is included.

In order to more assuredly perform image capturing of the number plate of the vehicle V1 traveling at a speed exceeding the predetermined speed, the instruction unit 26 determines the number of frames to be a second number of frames F2 (e.g., 30 frames in one second), which is larger than the first number of frames F1. The number of frames may be determined based on the speed of the vehicle V1. For example, the faster the speed of the vehicle V1 is, the more the number of frames may be increased.

When the event is "wrong-way traveling", the selection unit 25 selects a camera 50 that performs image capturing of the occurrence place of the event and a camera 50 that performs image capturing of a place upstream of the occurrence place of the event (step S208, step S3).

More specifically, when a vehicle V1 traveling in the second region A2 in the direction opposite to the traffic direction AR1 has been detected based on the sensor information D1 from the sensor 40*b*, the selection unit 25 selects the camera 50*b* which performs image capturing of the second region A2 and the camera 50*a* which performs image capturing of a place upstream of the second region A2. The selection unit 25 need not necessarily select the camera 50 that performs image capturing of the occurrence place of the event and may select only the camera 50 that performs image capturing of the place upstream of the occurrence place of the event.

Subsequently, the instruction unit 26 determines image capturing conditions for the selected cameras 50*a*, 50*b* (step S209, step S4). Specifically, based on the occurrence time of the event and the speed of the vehicle V1 included in the event information D2, the instruction unit 26 determines image capturing times for the respective cameras 50*a*, 50*b*. In addition, the instruction unit 26 determines image capturing places and zoom magnifications for the respective cameras 50*a*, 50*b* such that the number plate of the vehicle V1 is included. Further, in order to more assuredly perform image capturing of the number plate of the traveling vehicle V1, the instruction unit 26 determines the number of frames to be the second number of frames F2, which is larger than the first number of frames F1.

When the event is "congestion", the selection unit 25 selects a camera 50 that performs image capturing of the occurrence place of the event (step S210, step S3). More specifically, when a congestion in the first region A1 has been detected based on the sensor information D1 from the sensor 40*a*, the selection unit 25 selects the camera 50*a* which performs image capturing of the first region A1.

In order to continuously monitor the start position (the end on the downstream side) and the end position (the end on the upstream side) of the congestion, the selection unit 25 may further select cameras 50 that perform image capturing of places upstream and downstream of the occurrence place of the event.

Subsequently, the instruction unit 26 determines an image capturing condition for the selected camera 50*a* (step S211, step S4). Specifically, the instruction unit 26 determines a zoom magnification (e.g., one times) of the camera 50*a* such that a complete view of the first region A1 is included. The vehicle V1 included in the congestion is traveling at a relatively low speed, and the situation of the congestion is not considered to immediately (e.g., within several seconds) change. Therefore, the instruction unit 26 determines the number of frames to be the first number of frames F1.

Next, the instruction unit 26 instructs the camera 50 selected by the selection unit 25 to perform image capturing (steps S5 to S7). For example, when the camera 50*a* (or the camera 50*b*) has been selected, the instruction unit 26 of the detection device 20*a* transmits a control signal to the camera 50*a* (or the camera 50*b*) (step S214, step S5). When the camera 50*c* has been selected, the instruction unit 26 of the detection device 20*a* transmits a control signal to the detection device 20*b* which controls the camera 50*c*, through the electric telecommunication network N1 (step S214, step S6). Then, the detection device 20b transmits the control signal to the camera 50c (step S7).

The camera 50 is operating in a normal mode during normal time (step S301, steps S8, S9). The normal mode is a mode in which image capturing of a complete view of a region as a target is performed at a number of frames equal to or less than the first number of frames F1, for example. The camera 50 may be operating in a standby mode during normal time (a mode in which the camera 50 stands by in a power saving manner without performing image capturing).

When the camera 50 has received the control signal from the instruction unit 26 (step S302), the camera 50 operates in a predetermined image capturing mode, based on the control signal (step S303, steps S10, S11). The predetermined image capturing mode is a mode in which image capturing is performed according to various types of image capturing conditions determined in step S4 by the instruction unit 26.

Upon ending the image capturing in the image capturing mode, the camera 50 transmits the image Im1 to the detection device 20 (step S304, steps S12 to S14). The detection device 20 stores the received image Im1 into the storage 22. Specifically, the camera 50a, 50b transmits the image Im1 to the detection device 20a (step S12). The camera 50c transmits the image Im1 to the detection device 20b (step S13), and the detection device 20b transmits the image Im1 to the detection device 20a through the electric telecommunication network N1 (step S14). The control unit 21 of the detection device 20a receives the images Im1 (step S215, steps S12, S14), and stores the received images Im1 into the storage 22.

Next, the detailed detection unit 27 of the detection device 20a detects the detailed information D3 of the event, based on the event information D2 and the image Im1 (step S216, step S15). For example, when the event is "fallen object", the detailed detection unit 27 trims the image Im to obtain the place of the fallen object M1, based on the event information D2, and detects the trimmed image as the detailed information D3. The detailed detection unit 27 may detect the image Im1 itself as the detailed information D3, without trimming the image Im1.

When the type of the event is "parking", "overspeed", or "wrong-way traveling", the detailed detection unit 27 identifies the place of the number plate of the vehicle V1 from the image Im1, based on the event information D2. Then, the detailed detection unit 27 reads the characters of the number plate and detects the character information as the detailed information D3. The detailed detection unit 27 may detect a trimmed image of the number plate, as the detailed information D3. That is, the detailed detection unit 27 detects, as the detailed information D3, information (information including at least one of character information of the number plate and an image including the number plate) regarding the number plate of the vehicle V1. When the type of the event is "congestion", the detailed detection unit 27 detects the image Im1 itself as the detailed information D3.

The detailed detection unit 27 stores the detected detailed information D3 into the storage 22, and transmits the detailed information D3 to the management device 200 through the communication unit 23 and the electric telecommunication network N1 (step S217, step S16). The control unit 201 of the management device 200 stores the detailed information D3 received in the communication unit 203 into the storage 202.

Advantageous Effect of the Present Embodiment

The detection device 20 has: the selection unit 25 which selects, in accordance with the detected event, a camera 50 to be used in capturing the image Im1 regarding the event out of a plurality of the cameras 50 installed on the road R1; and the instruction unit 26 which instructs the selected camera 50 to perform image capturing. Therefore, a more appropriate image Im1 can be recorded in accordance with the detected event. In addition, the detailed information D3 of the event can be more accurately detected based on the image Im1.

For example, when the type of the event is "overspeed", a camera 50 at a place downstream of the place where the event has been detected is instructed to perform image capturing. Thus, the traveling vehicle V1 can be more assuredly captured in the image Im1. When the type of the event is "wrong-way traveling", a camera 50 at a place upstream of the place where the event has been detected is instructed to perform image capturing. Thus, the traveling vehicle V1 can be more assuredly captured in the image Im1.

In particular, the instruction unit 26 determines, in accordance with the detected event, an image capturing condition for the camera 50 selected by the selection unit 25, and instructs the camera 50 selected by the selection unit 25 to perform image capturing under the image capturing condition. Therefore, a more appropriate image Im1 can be acquired in accordance with the event, and the detailed information D3 of the event can be more accurately detected based on the image Im1.

For example, when the event is "overspeed" or "wrong-way traveling", the instruction unit 26 determines the number of frames of the selected camera 50 to be the second number of frames F2, which is larger than the first number of frames F1. Accordingly, the traveling vehicle V1 can be more assuredly included in the image Im1. When the event is "parking", "overspeed", or "wrong-way traveling", the image capturing place and the zoom magnification for the selected camera 50 are determined such that the number plate of the vehicle V1 is captured. Therefore, the detailed information D3 including the information regarding the number plate can be more accurately detected.

Modification

In the following, modifications of the embodiment will be described. In the modifications, components that are not changed from those of the embodiment will be denoted by the same reference signs, and description thereof will be omitted.

<Event Detection by Machine Learning>

The detection unit 24 may be configured to detect one or a plurality of events having occurred on the road R1 out of a plurality of events set in advance, by using a learned model that has learned through machine learning.

Figure 8:
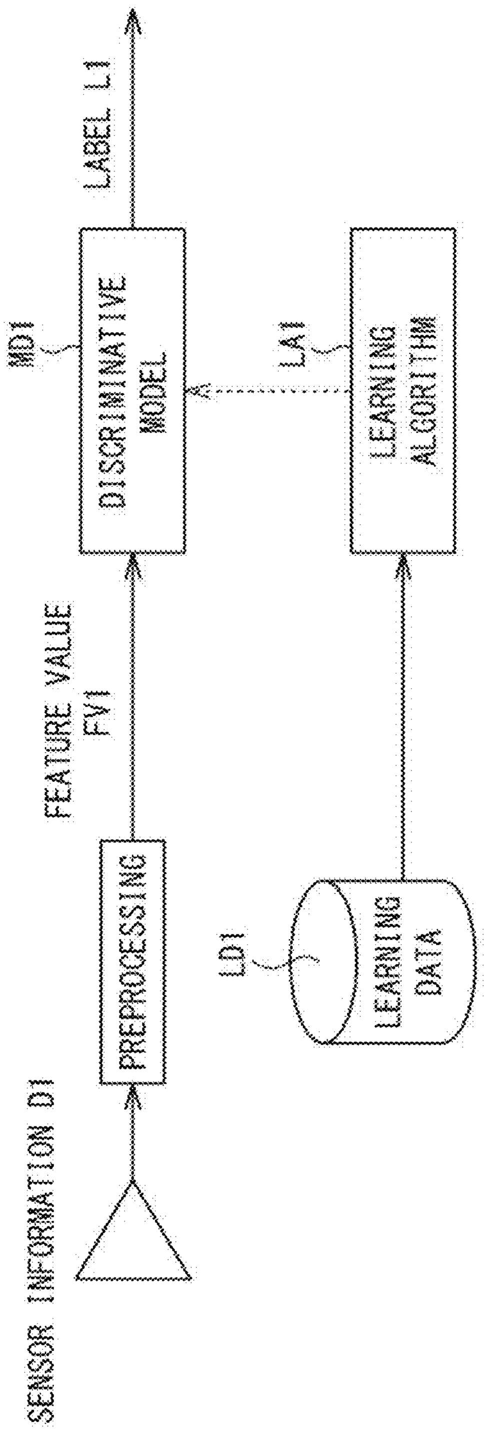
FIG. 8 is a block diagram describing a process by a learned discriminative model according to a modification.

FIG. 8 is a block diagram describing a process performed by a learned discriminative model.

The storage 22 has stored therein a learned discriminative model MD1. The discriminative model MD1 is a model that has been caused to learn the correspondence between a plurality of types of events and a label L1 according to a predetermined learning algorithm LA1, by using learning data LD1 (teacher data), for example. For the learning algorithm LA1, a support vector machine can be used, for example. For the learning algorithm LA1, an algorithm (e.g., a neural network such as deep learning) other than the support vector machine may be used.

In this modification, a feature value FV1 of the target object is extracted by preprocessing the sensor information D1 having been inputted. In this preprocessing, a feature value FV1 effective for detection of the event is extracted from the sensor information D1 through signal processing. The extracted feature value FV1 is inputted to the discriminative model MD1, and a label L1 as a detection result of the event is outputted.

Figure 9:
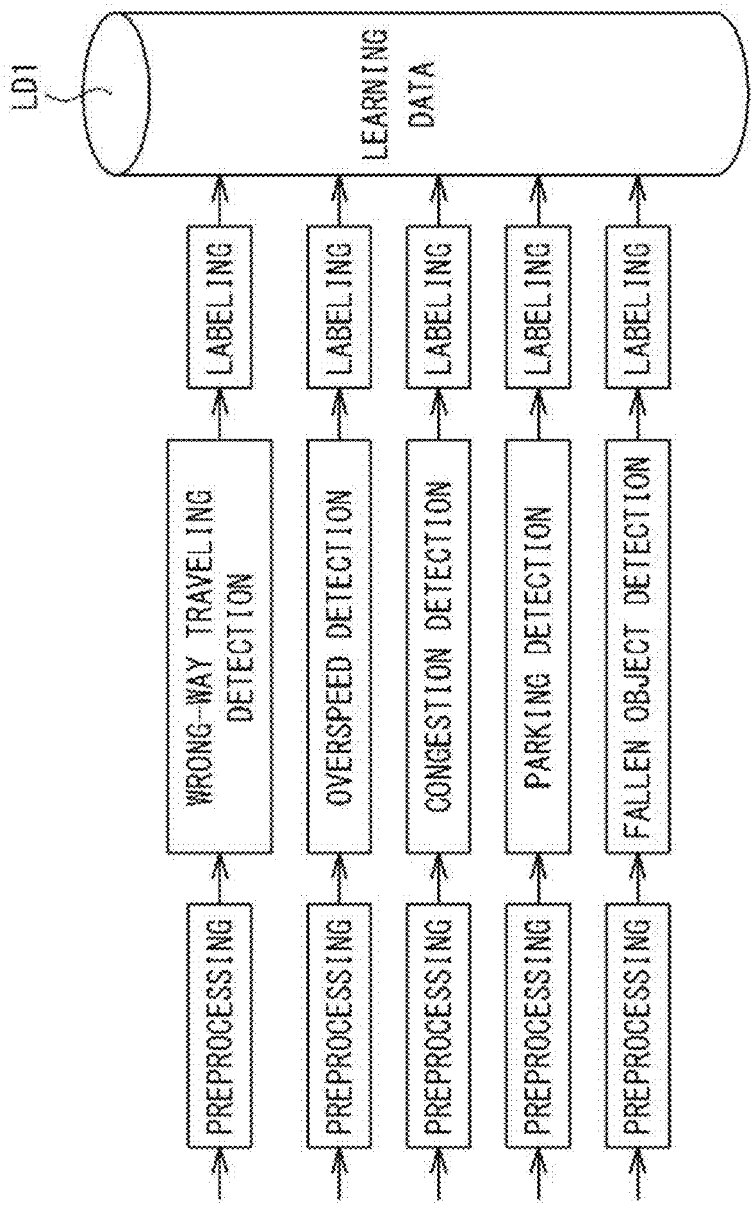
FIG. 9 is a block diagram describing a generation process of learning data according to the modification.

FIG. 9 is a block diagram describing a generation process of the learning data LD1.

The learning data LD1 is generated by individually detecting and labeling each event. Events such as wrong-way traveling, overspeed, and congestion can be automatically detected from the sensor information D1 as described above. When these events have been detected, data within a predetermined time period including the event detection time is extracted, and a label L1 of each event is associated with the extracted data, whereby the learning data LD1 can be generated.

Meanwhile, it is preferable that the learning data LD1 regarding parking (illegal parking) and a fallen object is manually generated. Specifically, for example, in the target region of the sensor 40, various types of illegal parking and various types of fallen objects are detected by the sensor 40, and based on the sensor information D1 displayed on a display, an operator inputs a corresponding label L1, whereby the learning data LD1 is generated. When the discriminative model MD1 is created by using such learning data LD1, a plurality of types of events can be accurately detected. In particular, detection accuracy for events such as a parked vehicle and a fallen object can be increased.

<Modification when Control Signals Compete with Each Other>

In the above-described embodiment, an event is detected based on the sensor information D1, and for example, in step S5, a control signal including one image capturing condition is transmitted to the camera 50. However, in actuality, a plurality of events may occur at similar time points on the road R1. For example, there may be a case where, in a state where a fallen object M1 is present in the first region A1, a vehicle V1 is wrong-way traveling in the second region A2.

In this case, the detection unit 24 of the detection device 20*a* determines that "fallen object" has occurred as an event, based on the sensor information D1 from the sensor 40*a*, and determines that "wrong-way traveling" has occurred as an event, based on the sensor information D1 from the sensor 40*b*. In accordance with the detected event "fallen object", the selection unit 25 selects the camera 50*a* which performs image capturing of the occurrence place of the "fallen object", and the instruction unit 26 determines an image capturing condition therefor (e.g., a condition in which the zoom magnification is set to one times in order to capture an image of a complete view of the first region A1 and the number of frames is set to the first number of frames F1). Then, the instruction unit 26 transmits a control signal CS1 corresponding to the "fallen object" to the camera 50*a*.

In accordance with the detected event "wrong-way traveling", the selection unit 25 selects the camera 50*a* which performs image capturing of a place upstream of the occurrence place of the "wrong-way traveling", and the instruction unit 26 determines an image capturing condition therefor (e.g., a condition in which the zoom magnification is set to be larger than one times in order to capture an image of the number plate of the vehicle V1, and the number of frames is set to the second number of frames F2). Then, the instruction unit 26 transmits a control signal CS2 corresponding to the "wrong-way traveling" to the camera 50*a*.

As described above, there may be a case where, when a plurality of events having occurred on the road R1 have been detected at similar time points in the detection system 10, a plurality of control signals CS1, CS2 are transmitted at similar time points to the camera 50. That is, a plurality of control signals CS1, CS2 may compete with each other in a single camera 50.

In this case, it is conceivable that image capturing is performed in the order in which the control signals have been inputted to the camera 50. However, for example, when the control signal CS1 has been inputted to the camera 50*a* and the camera 50*a* has performed image capturing of a complete view of the first region A1 for a predetermined image capturing time period, based on the control signal CS1, there is a risk that the wrong-way traveling vehicle V1 passes through the first region A1 during the image capturing. In this case, there is a risk that image capturing of the wrong-way traveling vehicle V1 fails.

Therefore, in the present modification, priority parameters for respective types of the events are provided to the control signals. For example, when the type of the event is "overspeed", since the target of the image capturing is the traveling vehicle V1 and the vehicle V1 easily becomes, through reduction of the speed, out of the state of exceeding a predetermined speed, the time at which the camera 50 can successfully perform image capturing of the vehicle V1 during occurrence of the event is limited. Therefore, the priority of image capturing regarding "overspeed" is set to be highest.

When the type of the event is "wrong-way traveling", since the target of the image capturing is the traveling vehicle V1, the time at which the camera 50 can successfully perform image capturing of the vehicle V1 during occurrence of the event is limited to some extent. However, when compared with the case of "overspeed", the vehicle V1 is less likely to become out of the state of wrong-way traveling. Therefore, for example, even if the camera 50*c* fails in image capturing of the wrong-way traveling vehicle V1, there is a high possibility that another camera 50*a* can successfully perform image capturing. Therefore, the priority of image capturing regarding "wrong-way traveling" is set to be lower than "overspeed".

When the type of the event is "parking", since the target of the image capturing is the parked vehicle V1, the time at which the camera 50 can successfully perform image capturing of the vehicle V1 during occurrence of the event is longer than in the cases where the types of the events are "overspeed" and "wrong-way traveling". Meanwhile, the parked vehicle V1 may start and move from the place, and thus, it is appropriate that image capturing is performed earlier than when the event is "fallen object". Therefore, the priority of image capturing regarding "parking" is set to be lower than in "overspeed" and "wrong-way traveling" and is set to be higher than in "fallen object".

When the type of the event is "congestion", it is not necessary to acquire character information of the number plate, based on an image, or identify a fallen object, for example. Therefore, necessity for the image is lower than in the other events. Therefore, the priority of the image regarding "congestion" is set to be lower than in the other events. Accordingly, the priorities for the respective types of the events of the present modification are, in a descending order, overspeed, wrong-way traveling, parking, fallen object, and congestion. The priorities above are merely an example, and an order other than the above may be adopted.

When a plurality of control signals compete with each other in a single camera 50, image capturing is performed in an order from a control signal corresponding to an event having a higher priority. For example, when the control signal CS1 corresponding to "fallen object" has been inputted to the camera 50*a*, and then, the control signal CS2 corresponding to "wrong-way traveling" has been inputted during image capturing of the fallen object M1 by the camera 50*a*, the camera 50*a* suspends the image capturing based on the control signal CS1 once and performs image capturing of the wrong-way traveling vehicle V1, based on the control signal CS2 having a higher priority. With this configuration, even when a plurality of control signals compete with each other, an image can be more appropriately captured.

<Modification of Detection Device>

The detection device 20 according to the above embodiment is provided as a body separate from the sensor unit 30. However, a part or the entirety of the detection device 20 may be included in the sensor unit 30. For example, a computer may be mounted to the sensor unit 30, and the computer may detect an event, based on the sensor information D1 from the sensor 40. In this case, the computer mounted to the sensor unit 30 functions as the detection unit 24.

That is, the detection device 20 may be realized by a computer installed in one place as in the above embodiment, or may be realized by a plurality of computers distributed in the sensor unit 30.

<Modification of Camera and Sensor>

In the above embodiment, since the sensor 40 and the camera 50 are mounted to the sensor unit 30, the sensor 40 and the camera 50 are in one-to-one correspondence, and the installation intervals of the sensors 40 and the cameras 50 are equal. However, the sensor 40 and the camera 50 may be in one-to-many correspondence, and the installation intervals of the sensors 40 and the cameras 50 may be different.

For example, when a sensor 40 that can monitor a region corresponding to 200 m and a camera 50 that can monitor a region corresponding to 100 m are used, in order to detect an event in the first region A1 corresponding to 200 m, two cameras 50 may be caused to correspond to one sensor 40, such that the sensors 40 are installed every 200 m and the cameras 50 are installed every 100 m.

<Modification of Detection Unit>

In the detection system according to the present modification, a plurality of the sensor units 30 (the sensors 40) and a plurality of the detection devices 20 have a function of operating in cooperation with each other. Through this, a vehicle V1 that travels across target regions of the sensors 40 is tracked. In this modification, an event such as overspeed or wrong-way traveling is assumed as an event as the detection target. That is, when the detection system 10 has detected an event such as overspeed or wrong-way traveling, the detection system 10 identifies the target vehicle V1 of the event, and tracks the identified event target vehicle V1 in a region exceeding the target region where the event has been detected. Further, in accordance with the tracking situation, the present detection system 10 switches selection of the camera 50 that performs image capturing of the event target vehicle V1, thereby tracking and recording the event target vehicle V1.

A plurality of the sensor units 30 perform linked operation by operating at an identical time. The plurality of the respective sensor units 30 acquire time information from an NTP (Network Timing Protocol) server, for example, thereby synchronizing the time.

Figure 10:
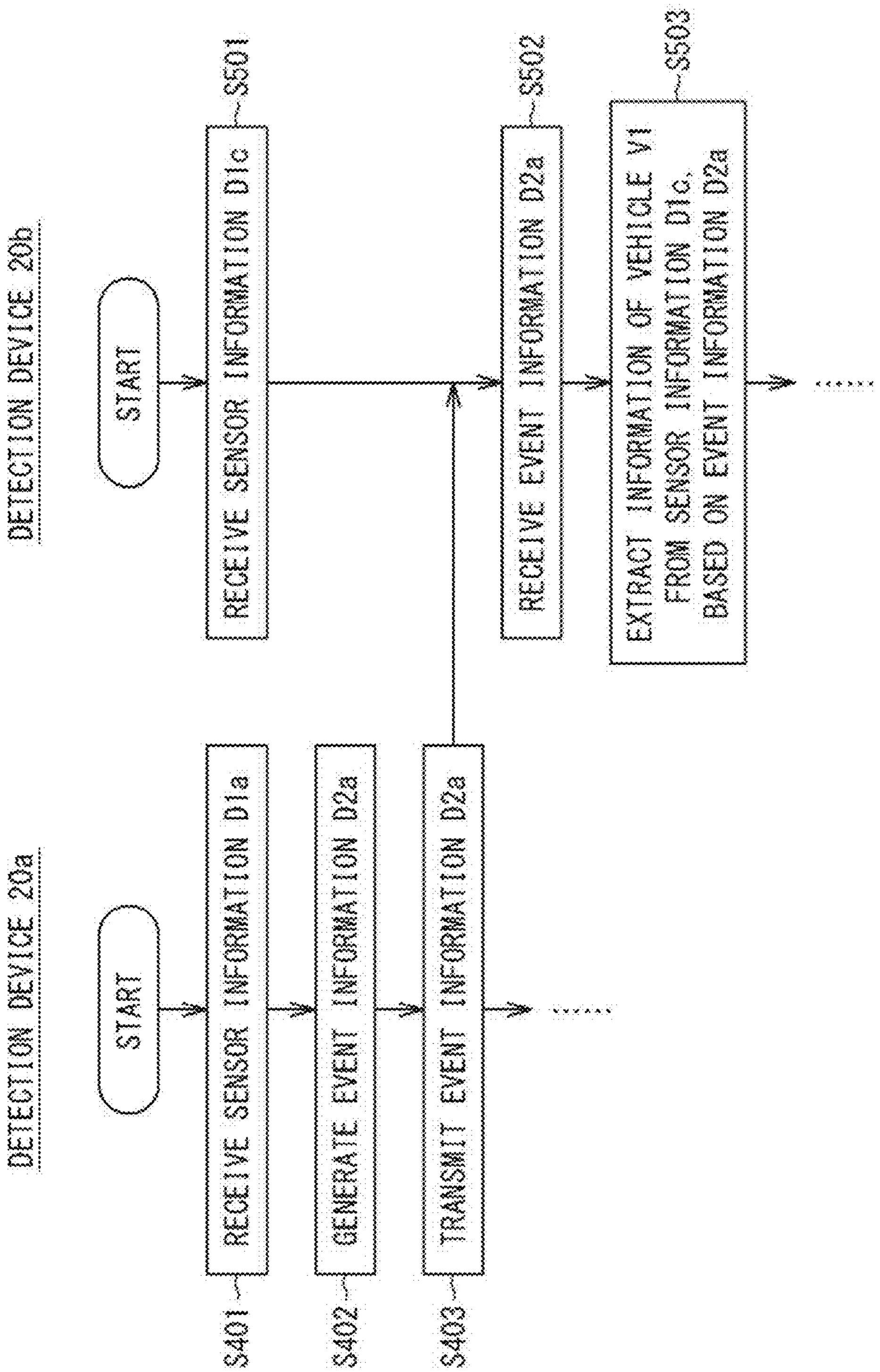
FIG. 10 is a flowchart showing an order of operations executed by a detection device according to a modification.

FIG. 10 is a flowchart showing an order of operations executed by the detection devices 20*a*, 20*b* according to the present modification. In this example, a process in a partial tracking section when the event target vehicle V1 is tracked will be described.

In the following, the sensor information D1 acquired from the sensors 40*a*, 40*c* will be referred to as sensor information D1*a*, D1*c*, respectively, and the event information D2 detected based on the sensors 40*a*, 40*c* will be referred to as event information D2*a*, D2*c*, respectively, in order to distinguish them from each other.

With reference to FIG. 1, for example, it is assumed that the vehicle V1 has traveled at a speed exceeding a predetermined speed in the first region A1. The detection device 20*a* detects overspeed of the vehicle V1. Specifically, the detection device 20*a* receives the sensor information D1*a* from the sensor 40*a* (step S401). Subsequently, the detection unit 24 of the detection device 20*a* detects an event "overspeed", based on the received sensor information D1*a*, and generates the event information D2*a* including the vehicle ID, the position, the speed, the size, and the like of the vehicle V1 (step S402). In accordance with the detected event (overspeed), the detection device 20*a* selects a camera 50 that performs image capturing of the occurrence place of the event, and a camera 50 that performs image capturing of a place downstream of the occurrence place of the event. The detection device 20*a* issues an image capturing instruction to the camera 50 that performs image capturing of the occurrence place of the event, and transmits the event information D2*a* to the detection device 20*b* positioned downstream (step S403).

The detection device 20*b* has received the sensor information D1*c* from the sensor 40*c* (step S501). The detection device 20*b* receives the event information D2*a* from the detection device 20*a* (step S502). In the detection device 20*b*, the sensor information D1*c* may be received after the event information D2*a* has been received. Based on the event information D2*a*, the detection device 20*b* extracts information of the vehicle V1 from the sensor information D1*c* (step S503). With this configuration, even when the event "overspeed" is not included in the sensor information D1*c* acquired from the sensor 40*c*, information (e.g., position, speed) of the vehicle V1 can be acquired from the sensor information D1*c*.

The detection device 20*b* further provides, as the vehicle ID of the event information D2*c* generated based on the sensor 40*c*, the same ID (or a corresponding ID) as the ID of the vehicle included in the event information D2*a* received from the detection device 20*a*. Accordingly, the event information D2*a* detected based on the sensor 40*a* and the event information D2*c* detected based on the sensor 40*c* can be associated with each other. Since the same (or a corresponding) ID is provided to the vehicle V1 in the separate pieces of the event information D2*a*, D2*c*, the vehicle V1 can be more easily tracked.

In accordance with detection of the vehicle V1, the detection device 20*b* selects a camera 50 that performs image capturing of the vehicle V1 and determines an image capturing condition. The detection device 20*b* issues an image capturing instruction to the selected camera, and transmits the event information D2*a* received from the detection device 20*a* and the event information D2*c* detected by the detection device 20*b* itself, to another detection device positioned downstream of the detection device 20*b*. In this manner, the detection system according to the present modification records the overspeed vehicle V1 while tracking the vehicle V1.

In this modification, an example in which an event of overspeed has been detected has been shown. However, the present disclosure is not limited to this example. For example, when an event of wrong-way traveling has been detected, recording may be performed while the event target vehicle is tracked. In this case, the event information is transmitted to another detection device positioned upstream of the detection device having detected the event.

<<Others>>

The sensor 40 of the above embodiment transmits an electromagnetic wave to the road R1, and acquires, based on a reflected wave thereof, the sensor information D1 including information regarding an event that occurs on the road R1. However, the sensor 40 may transmit an electromagnetic wave to a region other than the road R1 and may acquire the sensor information D1 including information regarding an event that occurs in the region other than the road R1. For example, when a fallen object M1 such as trash is located at a slope on a side of the road R1, there is a risk that the fallen object M1 moves due to wind or the like to enter the road R1. Therefore, the sensor 40 may acquire the sensor information D1 from a region positioned in the vicinity of the road R1, in addition to the road R1. Then, in the region positioned in the vicinity of the road R1, an event that may cause a trouble in passage of the vehicle V1 on the road R1 in the future may be detected by the detection device 20.

In the above embodiment, based on the sensor information D1, at least one event is detected out of a plurality of types of predetermined events set in advance. However, the predetermined events set in advance need not be of a plurality of types, and one type of a predetermined event may be set in advance. In this case as well, when the detection unit 24 has detected the event set in advance, the detection unit 24 selects, in accordance with the content of the event, a camera 50 that captures an image regarding the event out of a plurality of the cameras 50 installed on the road R1. Examples of the content of the event include the occurrence place of the event and the type of the event. For example, in accordance with the content (i.e., occurrence place of the event) of the detected event, the detection unit 24 selects a camera 50 (e.g., a camera 50 close to the event occurrence place) suitable for image capturing of the event.

For example, based on the sensor information D1, the detection unit 24 may detect only "overspeed" as the event. That is, only the route of step S203→S206→S207 in FIG. 4 may be selected. In this case, since the selection unit 25 selects a camera 50 that performs image capturing of the occurrence place of the event and a camera 50 that performs image capturing of a place downstream of the occurrence place of the event, failure in image capturing of the vehicle V1 can be prevented, and the image information regarding the event (overspeed) can be more accurately recorded.

Further, for example, based on the sensor information D1, the detection unit 24 may detect only "wrong-way traveling" as the event. That is, only the route of step S203→S208→S209 in FIG. 4 may be selected. In this case, the selection unit 25 selects a camera 50 that performs image capturing of the occurrence place of the event and a camera 50 that performs image capturing of a place upstream of the occurrence place of the event. Therefore, failure in image capturing of the vehicle V1 can be prevented, and the image information regarding the event (wrong-way traveling) can be more accurately recorded.

<<Supplementary Note>>

At least parts of the above embodiment and the various types of modifications may be combined with each other as desired. The embodiment disclosed herein is merely illustrative and not restrictive in all aspects. The scope of the present disclosure is defined by the scope of the claims, and is intended to include meaning equivalent to the scope of the claims and all modifications within the scope.

REFERENCE SIGNS LIST

10 detection system
20, 20*a*, 20*b* detection device
21 control unit
22 storage
23 communication unit
24 detection unit
25 selection unit
26 instruction unit
27 detailed detection unit
200 management device
201 control unit
202 storage
203 communication unit
30, 30*a*, 30*b*, 30*c* sensor unit
31, 31*a* housing
40, 40*a*, 40*b*, 40*c* sensor
50, 50*a*, 50*b*, 50*c* camera
51 movable part
52 zoom lens
53 imaging element
6*a*, 6*b* post
TC1 traffic control center
N1 electric telecommunication network
R1 road
A1 first region
A2 second region
A3 third region
V1 vehicle
M1 fallen object
AR1 traffic direction
D1, D1*a*, D1*c* sensor information
D2, D2*a*, D2*c* event information
D3 detailed information
Im1 image
F1 first number of frames
F2 second number of frames
CS1, CS2 control signal
FV1 feature value
L1 label
LD1 learning data
LA1 learning algorithm
MD1 discriminative model

The invention claimed is:

1. A detection device comprising:
circuitry configured to
acquire sensor information from a sensor, the sensor being configured to transmit an electromagnetic wave to a road and receive the electromagnetic wave reflected by a target object to detect the target object, circuitry being configured to cluster points from the electromagnetic wave to detect an event set in advance and to detect the target object, based on the acquired sensor information;
determine a type of the event detected as one of a plurality of types including at least illegal parking of the target object, another object on the road, overspeed of the target object, and wrong-way traveling of the target object;
select, in accordance with the type of the event detected by the circuitry, a camera that captures an image regarding the event out of a plurality of cameras installed on the road; and instruct the camera selected by the circuitry to perform image capturing.

2. The detection device according to claim 1, wherein subsequent to the circuitry having detected overspeed road traveling by a vehicle as the event, the circuitry selects, out of the plurality of cameras, a camera of which an image capturing target is a region downstream in a traveling direction of the road with respect to a target region where the sensor acquires the sensor information.

3. The detection device according to claim 1, wherein subsequent to the circuitry having detected wrong-way traveling of a vehicle on the road as the event, the circuitry selects, out of the plurality of cameras, a camera of which an image capturing target is a region upstream in a traveling direction of the road with respect to a target region where the sensor acquires the sensor information.

4. The detection device according to claim 1, wherein in accordance with the event detected by the circuitry, the circuitry determines, as an image capturing condition for the camera selected by the circuitry, either of a first image capturing condition under which image capturing is performed at a predetermined number of frames, and a second image capturing condition under which image capturing is performed at a number of frames larger than the predetermined number of frames, and issues an instruction to perform image capturing under the determined image capturing condition.

5. The detection device according to claim 4, wherein subsequent to the circuitry having detected parking of a vehicle on the road, a congestion of the road, or presence of the object on the road, as the event set in advance, the circuitry determines the first image capturing condition as the image capturing condition for the camera selected by the circuitry, and issues an instruction to perform image capturing under the determined first image capturing condition, and subsequent to the circuitry having detected overspeed road traveling by a vehicle at a speed exceeding a legal speed or a designated speed or wrong-way traveling of a vehicle on the road, as the event set in advance, the circuitry determines the second image capturing condition as the image capturing condition for the camera selected by the circuitry, and issues an instruction to perform image capturing under the determined second image capturing condition.

6. The detection device according to claim 1, further comprising a detailed circuitry configured to, based on the image captured by the camera selected by the circuitry, detect detailed information of the event detected by the circuitry.

7. The detection device according to claim 6, wherein subsequent to the circuitry having detected overspeed road traveling by a vehicle at a speed exceeding a legal speed or a designated speed, wrong-way traveling of a vehicle on the road, or parking of a vehicle on the road, as the event set in advance, the detailed circuitry detects information regarding a number plate of a target vehicle as the detailed information.

8. A detection method comprising:

acquiring with circuitry sensor information from a sensor, the sensor being configured to transmit an electromagnetic wave to a road and receive the electromagnetic wave reflected by a target object to detect the target object, clustering points of the electromagnetic wave to detect an event set in advance and to detect the target object, based on the acquired sensor information;

determining a type of the event detected as one of a plurality of types including at least illegal parking of the target object, another object on the road, overspeed of the target object, and wrong-way traveling of the target object;

selecting with the circuitry, in accordance with the type of the detected event, a camera that captures an image regarding the event out of a plurality of cameras installed on the road; and instructing with the circuitry the selected camera to perform image capturing.

* * * * *